United States Patent
Becker et al.

[11] Patent Number: 6,158,302
[45] Date of Patent: Dec. 12, 2000

[54] TORQUE SUPPORT

[75] Inventors: Eberhard Becker; Thomas Düllmann, both of Hagen; Heinz Flaig, Bochum; Winfried Gievers, Wetter; Gregor Jansen, Bottrop; Hans-Hermann Osthoff, Wetter; Josef Paul Saeftel, Castrop-Rauxel; Roland Staggl; Jan-Helge Steinkopf, both of Wetter; Manfred Stöber, Witten, all of Germany

[73] Assignee: Mannesmann AG, Düsseldorf, Germany

[21] Appl. No.: 09/281,658

[22] Filed: Mar. 30, 1999

[30] Foreign Application Priority Data

Apr. 17, 1998 [DE] Germany ............................ 198 17 930

[51] Int. Cl.⁷ ............................ F16H 57/01; F16M 11/00
[52] U.S. Cl. ........................ 74/606 R; 74/15.66; 248/674
[58] Field of Search ............................ 74/606 R, 15.66; 403/154, 155, 161, 71, 69; 248/27.1, 27.3, 674, 200, 201, 205, 635, 672

[56] References Cited

U.S. PATENT DOCUMENTS

| | | | |
|---|---|---|---|
| 3,432,705 | 3/1969 | Lindtveit | 248/674 X |
| 3,591,216 | 7/1971 | Onufer | 403/161 X |
| 3,984,191 | 10/1976 | Doty | 403/155 X |
| 4,566,865 | 1/1986 | Nishitsuji et al. | 248/674 X |
| 4,601,378 | 7/1986 | Pierce et al. | 248/674 X |
| 4,697,948 | 10/1987 | Fukuda | 403/155 X |
| 5,364,062 | 11/1994 | Doyle, Jr. et al. | 248/674 X |
| 5,524,860 | 6/1996 | Ives | 248/674 |
| 5,925,954 | 7/1999 | Gillieron | 248/672 X |

FOREIGN PATENT DOCUMENTS

| | | | |
|---|---|---|---|
| 0 255 021 | 2/1988 | European Pat. Off. | A01D 34/08 |
| 864 183 | 1/1953 | Germany . | |
| 33 42 502 | 3/1989 | Germany | F16H 57/00 |
| 40 21 054 | 1/1992 | Germany | F16M 1/04 |
| 40 21 054 | 9/1992 | Germany | F16M 1/04 |
| 297 22 631 U | 4/1998 | Germany | F16C 13/00 |

*Primary Examiner*—David A. Bucci
*Assistant Examiner*—Marcus Charles
*Attorney, Agent, or Firm*—Cohen, Pontani, Lieberman & Pavane

[57] ABSTRACT

A torque support, especially for wheel blocks, is arranged between a gear unit housing with a drive shaft and a driven unit housing. The torque support includes a plate-shaped base body which is detachably fastened to the gear unit housing with fastening elements. The plate-shaped base plate has at least two fastening locations comprising through openings for fastening the torque support to the driven unit housing. To keep the shearing forces resulting from the torque support and acting on the gear shaft small while the torsional moment is simultaneously absorbed with low play and in such a way that load peaks are damped, a corresponding plastic ring body is inserted into each through-opening in a positive-locking engagement. A side of the plastic ring body facing the driven unit housing has an edge area which widens radially outward forms an elastic disk element arranged between the driven unit housing and the torque support.

6 Claims, 3 Drawing Sheets

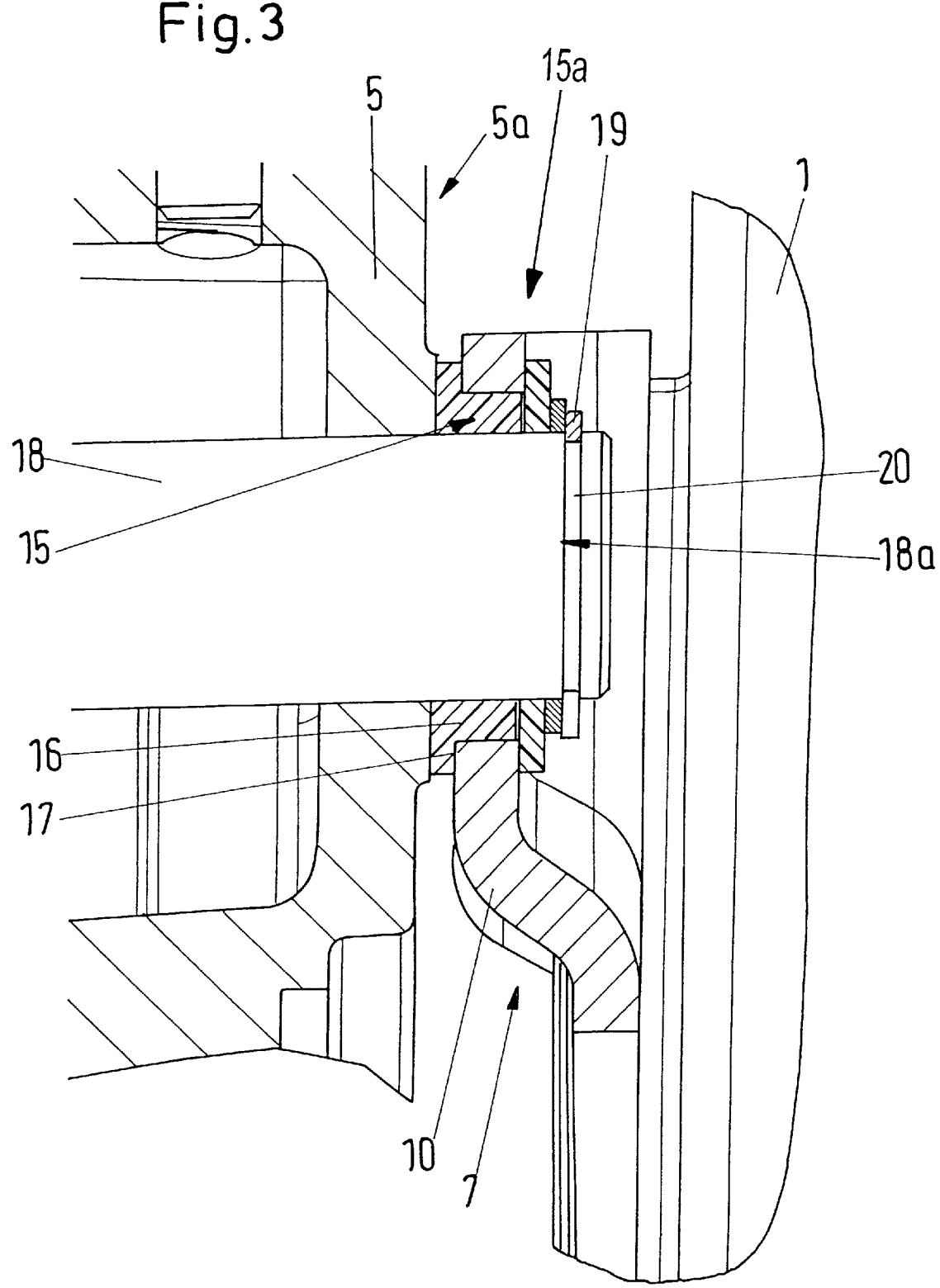

TORQUE SUPPORT

BACKGROUND OF THE INVENTION

1. Field of the Invention

The invention is directed to a torque support arranged between a gear unit housing and a driven unit housing.

2. Description of the Related Art

A prior art torque support arranged between an engine and a wheel block is disclosed by German reference DE 40 21 054. This torque support is plate-shaped and has two parallel contact faces. One of the two contact faces abuts the engine housing and is fastened thereto by screws. The other of the two contact faces at least partially abuts the wheel block and, for purposes of supporting occurring torques, the torque support is additionally fastened at one location to the wheel block. The radial distance between the engine shaft and the fastening location is selected so as to be as large as possible. The connection between the engine and wheel block comprises a flanging on each of the components with meshing teeth.

This prior art torque support supports torques reliably and with little play such that the transmission shaft is not loaded with bending stresses by transverse or shearing forces resulting from the torque support. However, this torque support requires tight tolerances for the meshing teeth and is therefore difficult and costly to manufacture. When the toothing tolerances are increased, the torque support can be manufactured more easily and inexpensively, but it is no longer practical, especially for applications involving larger constructional size and stresses.

SUMMARY OF THE INVENTION

The object of the present invention is to provide a torque support for arrangement between a gear unit housing having an input shaft and a driven unit housing in which the shearing forces resulting from the supporting of torque and acting on the input shaft are small and the effective torsional moment is absorbed with low play such that load peaks are damped without requiring high dimensional accuracy.

This object is met by a torque support arrangeable between a gear unit housing with a drive shaft and a driven unit housing, comprising a plate-shaped base body having a first side arrangable on said gear unit housing such that said plate-shaped base is detachably fastenable to the gear unit housing via fastening elements, said plate-shaped base body having at least two through-openings usable for fastening said plate-shaped base body to the driven unit housing, a plastic ring body inserted into each said at least two through-openings in a positive-locking engagement, and an edge area on a side of said plastic body opposing said first side of said plate shaped base body which widens radially outward and which forms an elastic disk element arrangeable between the driven unit housing and said torque support.

The invention provides that a corresponding plastic ring body is inserted into each through-opening of the torque support in a positive-locking engagment. A side of the plastic ring body facing the driven unit housing comprises an edge area which widens radially outward and forms an elastic disk element arranged between the driven unit housing and the torque support. This disk element effectively damps occurring load peaks in an economical manner.

A uniform support of occurring torques is achieved in that the base body of the torque support has a central opening through which the drive shaft of the driving unit extends. Fastening elements are arranged at an identical radial distance from the central opening for connecting the base body to the gear unit housing. The through-openings are also arranged at identical distances relative to the central opening and accordingly relative to the drive shaft.

To simplify mounting, the torque support is constructed in such a way that every through-opening is formed at a step-shaped projection or angled edge area of the base body which faces the housing. In this way it is possible to produce the torque support from a simple metal plate.

Compensation of the occurring centrifugal forces is appreciably reduced when the angular distance of the fastening locations about the central opening is between 90° and 150°.

Particularly good damping characteristics with short damping paths are exhibited when the plastic ring body is formed of polyamide with a glass fiber component.

In a construction which is simple and easy to mount, the driven unit housing includes pins which project out of the housing, extend through the plastic ring body in a positive locked engagement in the though holes, and held at their free end by a securing ring which engages in a radial groove constructed proximate the free end of the pin. This embodiment provides a compact solution.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 3 is a cross sectional view through a fastening location of the torque support of FIGS. 1 and 2 showing a plastic ring body according to an embodiment of the present invention.

DETAILED DESCRIPTION OF THE PRESENTLY PREFERRED EMBODIMENTS

Figure 1:
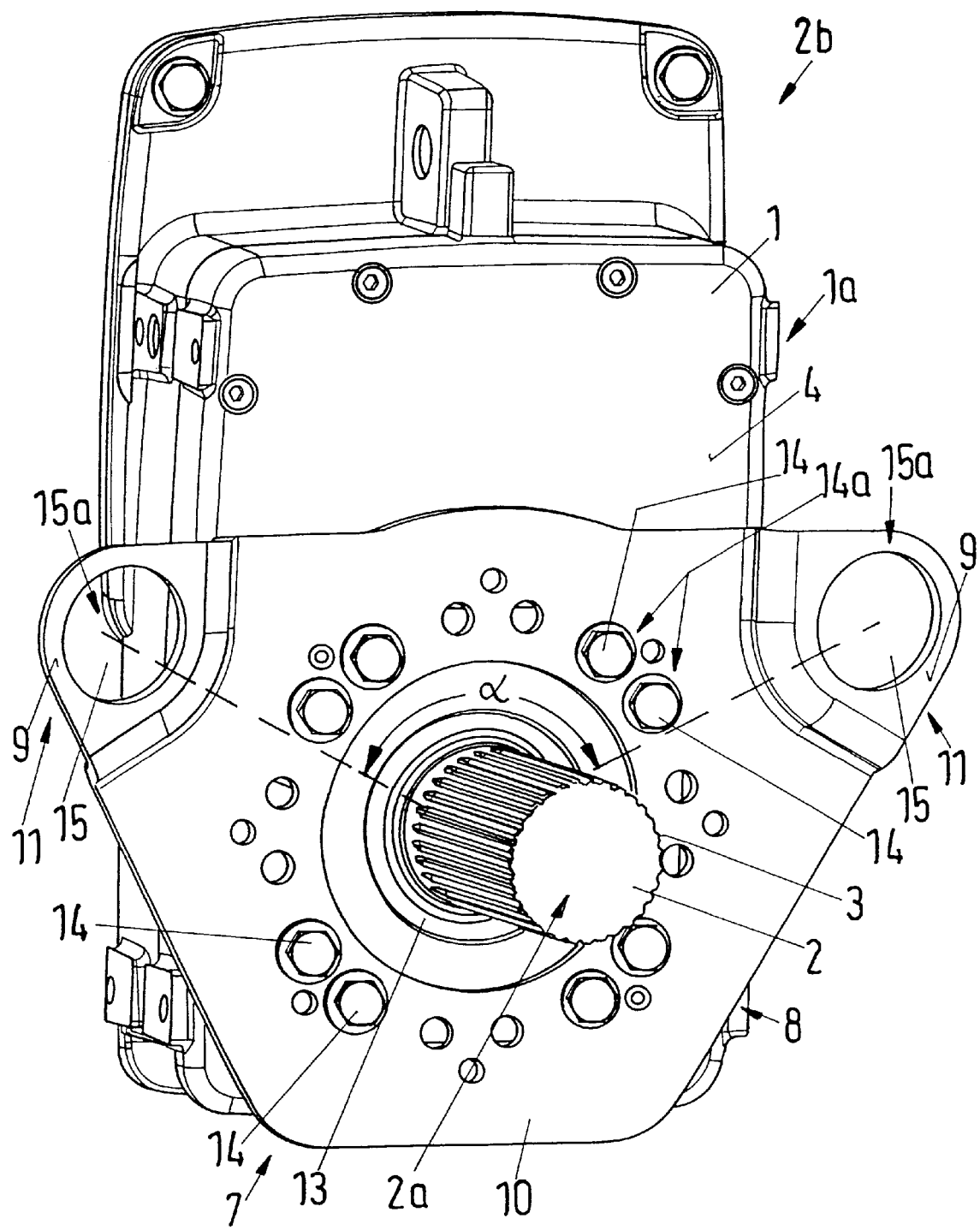
FIG. 1 is a perspective view of a gear unit housing with torque support according to an embodiment of the invention.

FIG. 1 shows a torque support 7 according to the present invention connected to an outer surface 4 of a gear unit housing 1 of a gear unit 1a. A gear shaft 2 projects from the gear unit 1a perpendicular to the outer surface 4. A driving unit 2b is operatively connected to the gear unit 1a for driving the gear shaft 2 via the gear unit 1a. The gear shaft 2 projects outward from the gear unit 1a and has an external toothing 3.

The torque support 7 has, with reference to FIG. 1, a lower contact face 8 and an upper contact face 9. The upper contact face 9 is formed of two smaller partial surfaces separated by a distance from one another and lying in a common plane. The lower and upper contact faces 8 and 9 extend parallel to one another. As shown in FIG. 1, the torque support 7 is formed of a plate-shaped base body 10 having angled corner regions 11 facing away from the gear unit housing 1. The angled construction of the corner regions 11 ensures that the contact surface 9 is arranged at an offset distance relative to the contact face 8. In the preferred embodiment, the offset distance is greater than the thickness of the metal plate used for producing the base body 10. Instead of the angled shape of the base body 10, a step-shaped projection is, of course, also possible, wherein this step-shaped projection is arranged on the, in this case, planar plate of the base body 10.

FIG. 1 further shows a central opening 13 arranged in a center of the trapezoidal base body 10 through which the gear shaft 2 extends. The planar lower contact face 8 of the torque support 7 contacts the front outer surface 4 of the gear unit housing 1. The front outer surface 4 comprises a contact face of the gear unit housing 1a. The torque support 7 is detachably fastened to the gear unit housing 1 by fastening elements 14a such, for example, as screws 14.

Figure 2:
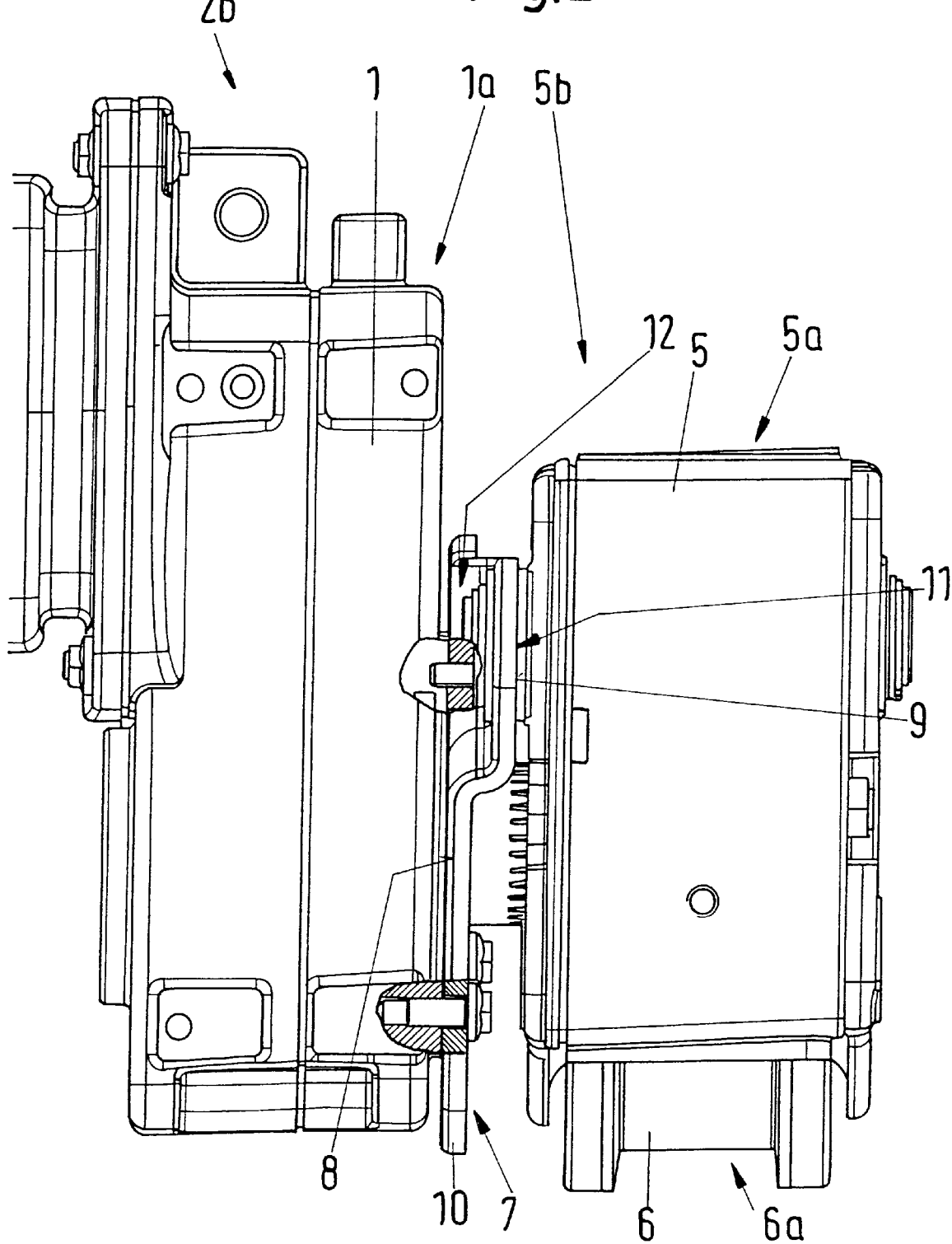
FIG. 2 is a side view of the embodiment of FIG. 1 with a flanged-on wheel block.

A through-opening 15 is provided through each of the two upper angled corner areas 11. Referring also to FIG. 2, the gear housing 1 is connected to a housing 5 of a wheel block 5a. The housing 5 and the wheel block 5a are part of a driven unit 5b. The through-openings 15 are used as fastening locations 15a for connecting the torque support 7 to the housing 5 of the wheel block 5a. As shown in FIG. 1, the center points of the through-openings 15 are arranged radially equidistant from the central opening 13 and gear unit axis 2.

The angular spacing α of the through-openings 15 about the center axis of the gear shaft 2 relative to one another is about 120° as depicted in FIG. 1. However, the preferred embodiment includes any angular spacing between 90° and 150°. If the torque support 7 is long enough, an angular spacing of approximately 180° may also be used.

FIG. 2 shows a side view of the arrangement according to FIG. 1 with the flanged-on housing 5. The torque support 7 is arranged between the gear unit 1a and housing 5. A running wheel 6 projects down out of the housing 5 by a portion of the running surface and is rotatably supported in the housing 5. The gear shaft 2 is connected to the running wheel 6 to rotatably drive the running wheel. This driving connection may be accomplished, for example, by inserting the gear shaft 2 (not shown in FIG. 2) into an internal toothing of the running wheel 6. The axis of rotation of the gear shaft 2 is identical to the axis of rotation of the driven running wheel 6.

The outer contour of the parallelepiped or cuboid housing 5 of the compact wheel block 5a according to FIG. 2 defines the maximum possible distance that the through-openings 15 may be arranged from each other. The running wheel 6 occupies by far the largest space within the housing 5. As a consequence, only the corner areas of the housing 5 are available for the fastening the wheel block 5a to the torque support 7. As can be seen from FIG. 2, the angling of the two upper corner areas 11 of the torque support 7 toward the housing 5 creates a free space 12 which facilitates the fastening of the torque support 7 to the housing 5 of the wheel block 5a.

FIG. 3 shows a fastening location 15a of the torque support 7 in an enlarged cross-sectional view. A plastic ring body 16 is inserted into the through-opening 15. The plastic ring body 16 is designed such that it damps vibrations and has only small oscillation amplitudes. To that end, the plastic ring body 16 may, for example, comprise polyamide with a glass fiber component. As is shown in FIG. 3, the ring body 16 widens radially outward at an edge area 17 such that the plastic ring body 16 which is inserted in a positive engagement is prevented from slipping through the through-opening 15. The widened edge area 17 is located at a front side of the torque support 7 which faces the housing 5. When the gear unit housing 1, the torque support 7, and the housing 5 are in their assembled position, the widened edge area 17 forms an elastic disk element between the housing 5 and the torque support 7. Accordingly, the torque support 7 does not contact the wheel block 5a directly. The widened edge area 17 forms an elastic buffer similar to a washer between the contact face of the wheel block 5a and the torque support 7. The fastening of the torque support 7 is effected using fastening bolts or pins 18 fixedly connected with the housing 5 and having one end which projects out of the housing 5. The end of the pin which projects from the housing 5 is inserted through an opening 18a in the plastic ring body 16 which is inserted in the through-opening 15. The torque support 7 is held at the wheel block 5 by a securing ring 19 which engages in a radial groove 20 formed at the pin 18 which prevents the pin 18 from sliding out of the through-opening 15.

The invention is not limited by the embodiments described above which are presented as examples only but can be modified in various ways within the scope of protection defined by the appended patent claims.

We claim:

1. A torque support arrangeable between a gear unit housing with a drive shaft and a driven unit housing, comprising:

a plate-shaped base body having a first side arrangable on said gear unit housing, a second side opposing said first side, and fastening elements connectable to the gear unit housing such that said plate-shaped base is detachably fastenable to the gear unit housing via said fastening elements;

said plate-shaped base body having at least two through-openings usable for fastening said plate-shaped base body to the driven unit housing;

a plastic ring body inserted into each said at least two through-openings in a positive-locking engagement; and an edge area on a side of said plastic body facing said second side of said plate-shaped base body widens radially outward and forms an elastic disk element on said second side of said plate-shaped base body, wherein said plate-shaped base body comprises at least two offset areas comprising one of a step-shaped projection and an angled edge area, said at least two offset areas being offset toward said driven unit housing, and each said through-openings being arranged on one of said at least two offset areas.

2. The torque support of claim 1, wherein said plate-shaped base body has a central opening through which the drive shaft is insertable, and wherein said fastening elements are arranged at an identical radial distance from said central opening.

3. The torque support of claim 2, wherein said through-openings are arranged at equal distances from said central opening.

4. The torque support of claim 2, wherein an angular spacing of said through openings about said central opening is within a range including 90° to 150°.

5. The torque support of claim 1, wherein said plastic ring body comprises polyamide with a glass fiber component.

6. The torque support according to one of claim 1, further comprising a pin fastenable to the driven unit housing and insertable through said plastic ring body, said pin having a radial groove proximate an end of said pin which extends through said plastic ring body; and a securing ring engaging said radial groove of said pin for preventing said pin from being pulled out of said through hole toward said second side of said plate-shaped base body.

* * * * *